US00RE43218E

(19) United States
(12) Reissued Patent
Annadurai et al.

(10) Patent Number: US RE43,218 E
(45) Date of Reissued Patent: Feb. 28, 2012

(54) CIRCUIT AND METHOD FOR PROCESSING COMMUNICATION PACKETS AND VALID DATA BYTES

(75) Inventors: Andy P. Annadurai, Fremont, CA (US); Feng Han, Pleasanton, CA (US); Mohammed Rahman, Pleasanton, CA (US); Chris Tsu, Saratoga, CA (US)

(73) Assignee: Sartre Satire LLC, Las Vegas, NV (US)

(21) Appl. No.: 12/215,662

(22) Filed: Jun. 27, 2008

Related U.S. Patent Documents

Reissue of:
(64) Patent No.: 7,068,673
Issued: Jun. 27, 2006
Appl. No.: 10/087,228
Filed: Feb. 27, 2002

(51) Int. Cl.
*H04L 12/56* (2006.01)
*H04J 1/16* (2006.01)

(52) U.S. Cl. ..... 370/419; 370/476; 370/535; 710/54

(58) Field of Classification Search ..... 370/419, 370/476, 535; 710/54
See application file for complete search history.

(56) References Cited

U.S. PATENT DOCUMENTS 5,594,927 A * 1/1997 Lee et al. ..... 710/66
5,862,206 A 1/1999 Thomas et al.
7,366,208 B2 * 4/2008 Bowes ..... 370/535

* cited by examiner

*Primary Examiner* — John Pezzlo

(57) ABSTRACT

Method and apparatus for processing data packets within a communication system such as a synchronous optical network (SONET) detect an invalid byte and drop and shift bytes of data to address an invalid byte. A method according to one embodiment of the present invention, includes receiving a first data packet in the communication system. Thereafter, it is determined whether this packet ends with both a valid byte and an invalid byte of data. If both the valid and invalid bytes are present, the invalid byte is dropped and a valid byte from a succeeding data packet is concatenated with the valid byte of the first data packet, and byte shifting occurs in the succeeding data packet. Byte shifting continues until a second packet ending with an invalid byte is encountered. Skipping a clock cycle at the end of the second packet with the invalid byte results in packets with only valid data.

46 Claims, 8 Drawing Sheets

CIRCUIT AND METHOD FOR PROCESSING COMMUNICATION PACKETS AND VALID DATA BYTES

Matter enclosed in heavy brackets [ ] appears in the original patent but forms no part of this reissue specification; matter printed in italics indicates the additions made by reissue.

BACKGROUND OF THE INVENTION

The present invention relates generally to the field of communication systems and more specifically to a method and circuit for processing data packets and valid data bytes.

The coming of the modern information age has brought about phenomenal growth in demand for telecommunications-based products and services, driven primarily by the Internet. As the burgeoning expansion of the Internet continues along an unprecedented and unpredictable path, many new applications are foreseen and expected. These applications are placing increasing demands for ultra-high speed circuit solutions. In parallel, driven by the explosive growth in bandwidth requirements of multimedia applications, various ultra-high bit rate transmission techniques have been developed. Fiberoptic communications system speeds have increased from asynchronous-transfer-mode (ATM) rates of 155 Mb/s and synchronous optical network (SONET) rates of 622 Mb/s to the optical carrier (OC) standard of OC-192 at 10 Gb/s and OC-768 at 40 Gb/s. Over time a body of interface standards have developed to facilitate the interconnection of the various communication networks. In certain instances, however, the varying standards have presented unique challenges for system and integrated circuit designers. An example can be found in the data packet processing standards developed for SONETs.

SONET is a transport mechanism for multiplexing data from multiple networks onto fiber optic cabling. For example, IP (Internet protocol), ATM, and T1 are among the various types of networks that are interconnected via SONET rings. Since SONET interconnects different network types, it employs routers for converting protocols from one network type to another. In the case of IP protocols, for example, routers are used for converting IP packets for transmission on the SONET ring.

A typical router contains a line card for receiving data packets on one end, performing necessary conversions and sending out the packets at the other end. Among other components, line cards include a framer for framing/deframing data packets, and a processor for performing protocol conversion and for controlling packet traffic. The framer communicates with the processor through an interface known as the SPI-4 (system packet interface). The SPI-4 interface is a standard defined by a consortium of communication companies. This standard defines packet and cell transfer standards between a physical layer device (i.e., the framer) and a link layer device (i.e., the processor). The SPI-4 interface requires 16-bit data processing. That is, data is processed in 16 bit words, containing two bytes of data. Each packet contains an even number of bytes, each of which must be valid. However, many functional blocks employed in telecommunication systems including, for example, most network processors process data on byte (8 bit) boundaries as opposed to word (16 bit) boundaries. In such systems, a packet need only contain byte multiples for proper processing. For instance, it may contain odd multiples such as three bytes, seven bytes etc. Or, it may contain even multiples such as two bytes, eight bytes, etc. So long as the packet contains multiple bytes, it is properly processed. Upon arriving at the SPI-4 interface, however, data bytes contained in a packet must be processed as 16 bit words. The data bytes are first grouped into 16 bit words (two bytes) for processing. This presents no problems so long the packet contains an even number of bytes. If, however, the number of bytes is odd, a single byte will remain after grouping. For example, for a three byte packet, the first two bytes are grouped into a 16 bit word. The last byte can only be grouped with an empty byte. This empty byte is of course invalid and should be processed as such.

Identifying such invalid bytes and processing them in a manner that does not compromise the integrity of the data and speed of transmission is a challenging task. There are other similar incompatibilities between the varying interface standards and established infrastructure that give rise to such challenges.

There is, therefore, a need for methods and systems that can resolve such incompatibilities and the problems that may arise from erroneous processing of data packets in communication networks such as SONETs.

BRIEF SUMMARY OF THE INVENTION

The present invention provides methods and systems for improved processing of data packets in communication systems such as a synchronous optical network (SONET). Data packets received by communication systems often contain invalid data bytes. The present invention provides, in one embodiment, a method for processing data that drops these invalid bytes, and concatenates valid bytes for further processing. Concatenation refers to linking of data bytes across packet boundaries for further packaging into high speed packets.

According to a first aspect of the present invention, a method for processing data in a communication system, wherein the method includes the step of receiving a first data packet that comprises a plurality of pairs of bytes of data. Thereafter, the first data packet is examined to determine if the final pair of bytes comprises a valid byte and an invalid byte. If an invalid byte is present, the valid byte is concatenated with a byte from a subsequent packet. Concatenation is initiated by dropping the invalid byte. This leaves the valid byte in the first data packet. Thereafter, the method includes the steps of receiving a second data packet, and determining whether the second packet begins with a valid byte. If so, this valid byte is concatenated with the valid byte of the first data packet byte. In this manner, the first packet is completed with valid bytes, and may be sent out or packaged into a super packet. In one embodiment, data bytes within the second packet are shifted to occupy empty byte locations created by the preceding bytes.

According to another aspect of the present invention, a concatenation circuitry for processing data packets is disclosed. The concatenation circuitry features logic circuits for determining that a first packet ends with a valid byte and an invalid byte of data, and logic circuitry for dropping the invalid byte of data. Further, the concatenation circuitry includes logic circuitry for determining that a second data packet begins with a valid byte of data, and logic circuitry for concatenating the valid byte of the first data packet with the valid byte of the second data packet.

A further understanding of the nature and advantages of the present invention may be realized by reference to the remaining portions of the specification and the attached drawings. References to "steps" of the present invention should not be construed as limited to "step plus function" means, and is not intended to refer to a specific order for implementing the invention. In the drawings, the same reference numbers indicate identical or functionally similar elements.

DETAILED DESCRIPTION OF THE INVENTION

Figure 1A:
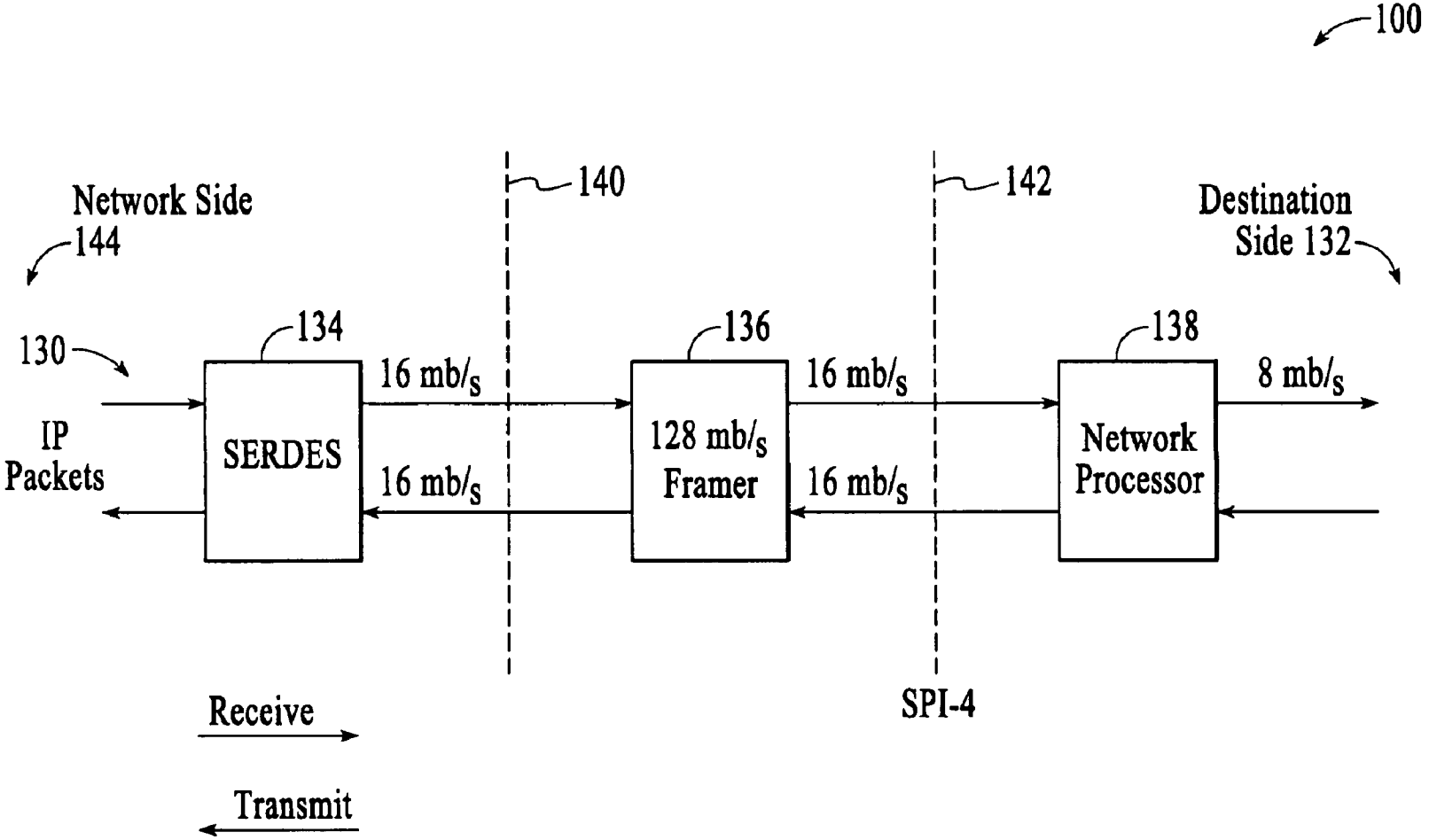
FIG. 1A is an exemplary communication system in which the present invention is implemented.

FIG. 1A is an exemplary communication system 100 in which the present invention is implemented.

Communication system 100 may be a transport mechanism for delivering high-speed data to a destination 132 via fiber optic cabling 130. An example of such a network is SONET. Various specific embodiments of the present invention are described herein in the context of a SONET implemented using 128 bit wide bus. It is to be understood, however, that the invention is applicable to other types of communication systems and networks, that specific bus width or other implementation-specific values and numbers provided herein are for illustrative purposes only, and that the invention applies to telecommunication systems with other implementations.

Among other components, communication system 100 includes fiber optic cabling 130 for receiving (and transmitting) high speed data such as IP packets. System 100 further includes a serializer-deserializer (or SERDES) 134 for serializing and deserializing data packets, and a framer 136 for decoding data packets, and for forwarding the payload to destination 132. In addition, a network processor 138 receives the deserialized data and outputs the payload along a byte boundary (8 bit) to destination 132.

For the receive direction, at interface 140 between SERDES 134 and framer 136, data bytes are processed along 16 bit boundaries at interface 140, and thereafter, grouped into 128 bit packets in framer 136. Following this, at interface 142 between framer 136 and processor 138, which is the SPI-4 interface, data bytes are processed again along 16 bit boundaries. These bytes are then output along eight byte boundaries by processor 138. Similarly, for the transmit direction, a reverse process may occur from destination 132 to network side 144. Thus, at the SPI-4 interface, packets containing eight bit bytes (or multiples thereof) are received from processor 138. These are processed and supplied to framer 136 as 16 bit words. At framer 136, eight groups of 16 bit words are grouped as 128 bit packets, etc. The words are packed into a 128 bit wide data bus and sent to a transmit first-in first-out (FIFO) structure (not shown) to be processed further by framer 136.

As previously noted, there is a chance that the last 16 bit word of packets received by framer 136 may contain invalid data bytes. This may happen when such packets contain odd number of bytes. In accordance with the present invention, exemplary 16 bit words received by framer 136 are processed to identify invalid bytes. Once identified, the invalid bytes are dropped, so that valid bytes are grouped into 128 bit packets.

Although the process occurs at the SPI-4 interface, one of ordinary skill in the art will realize that this is for illustrative purposes only, and that the process according to the invention may be applied to other instances where an invalid byte has been detected. It is advantageous to drop the invalid byte at the SPI-4 interface, before such a byte becomes further processed along the data path. After the invalid byte is dropped, a valid byte from one data packet is concatenated with a valid byte from the subsequent data packet. As used herein "concatenation" refers to the linking of data bytes from different packets into a high rate envelope.

Figure 1B:
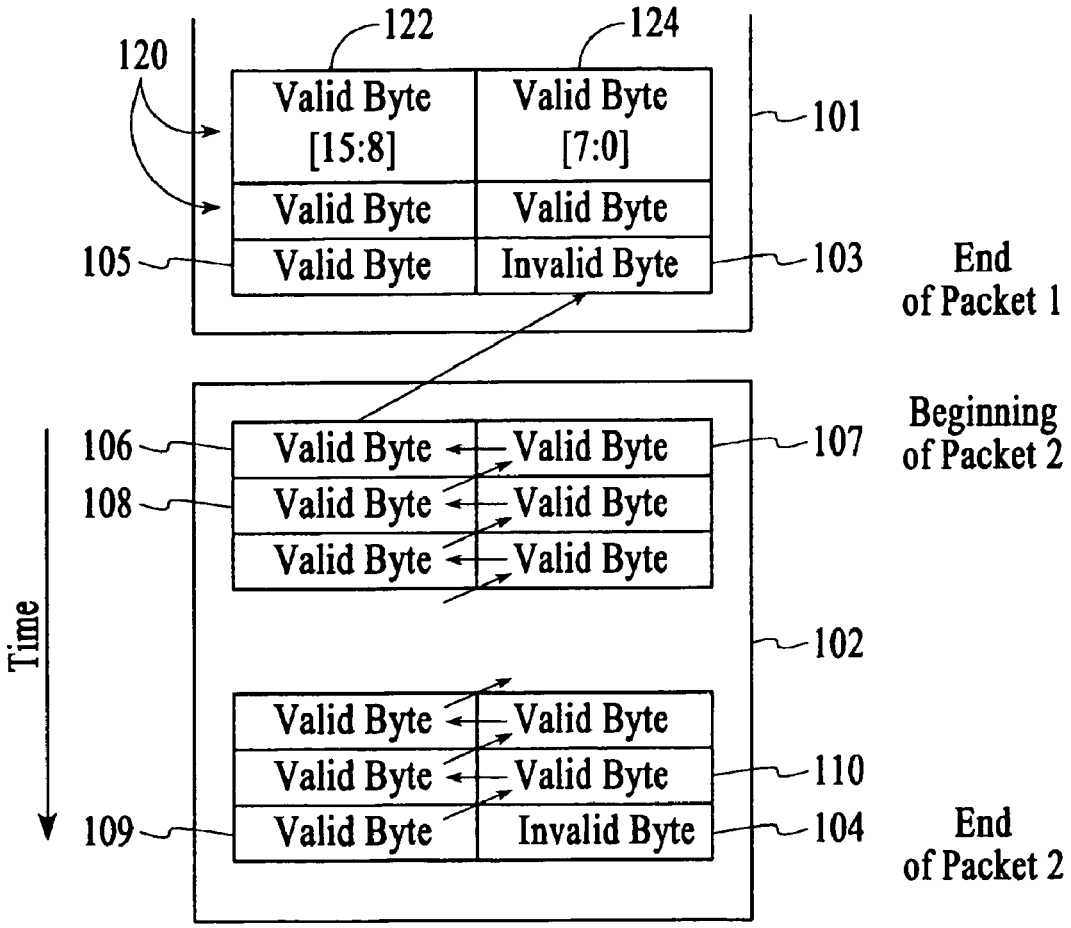
FIG. 1B illustrates concatenating data bytes from two packets both packets ending with invalid bytes, in accordance with an exemplary embodiment of the present invention.

FIG. 1B illustrates concatenating data bytes from two exemplary packets 101 and 102 both packets ending with invalid bytes 103 and 104, in accordance with an exemplary embodiment of the present invention.

More specifically, according to this exemplary embodiment of the invention, invalid byte 103 is dropped in order to concatenate valid data byte 105 from packet 101 with valid data byte 106 from packet 102. As shown, all bytes of packet 101 are valid except for invalid byte 103.

The concatenation process is initiated by first dropping invalid byte 103. In this fashion, an empty byte is created for valid byte 106 of packet 102. Next, valid byte 106 is concatenated with valid byte 105 to provide the last word of packet 101. This concatenation completes packet 101. At this point, packet 101 may be transmitted or packed into a high speed super packet. In one embodiment, this super packet contains five 16 bit packets for a total of 128 bits.

While the concatenation process as described thus far completes packet 101, it includes a byte shifting process to complete succeeding packet 102. This is because valid byte 106 is now empty, its content having been transferred to packet 101. To fill byte 106, byte 107 is shifted to byte 106. Similarly, byte 108 is shifted to byte 107 This shifting continues until byte 109 is shifted to byte 110. At this point, no further shifting occurs since the last remaining word contains only one byte 104 that is invalid. The byte shifting process is thus terminated. In this manner, only valid bytes are contained within packet 102 in accordance with this embodiment of the present invention. It should be noted that after byte 109 is shifted, the entire last word of packet 102 becomes empty. For this reason, when packet 102 is transmitted, the receiving system is informed that the last word is empty and can be ignored.

Figure 2:
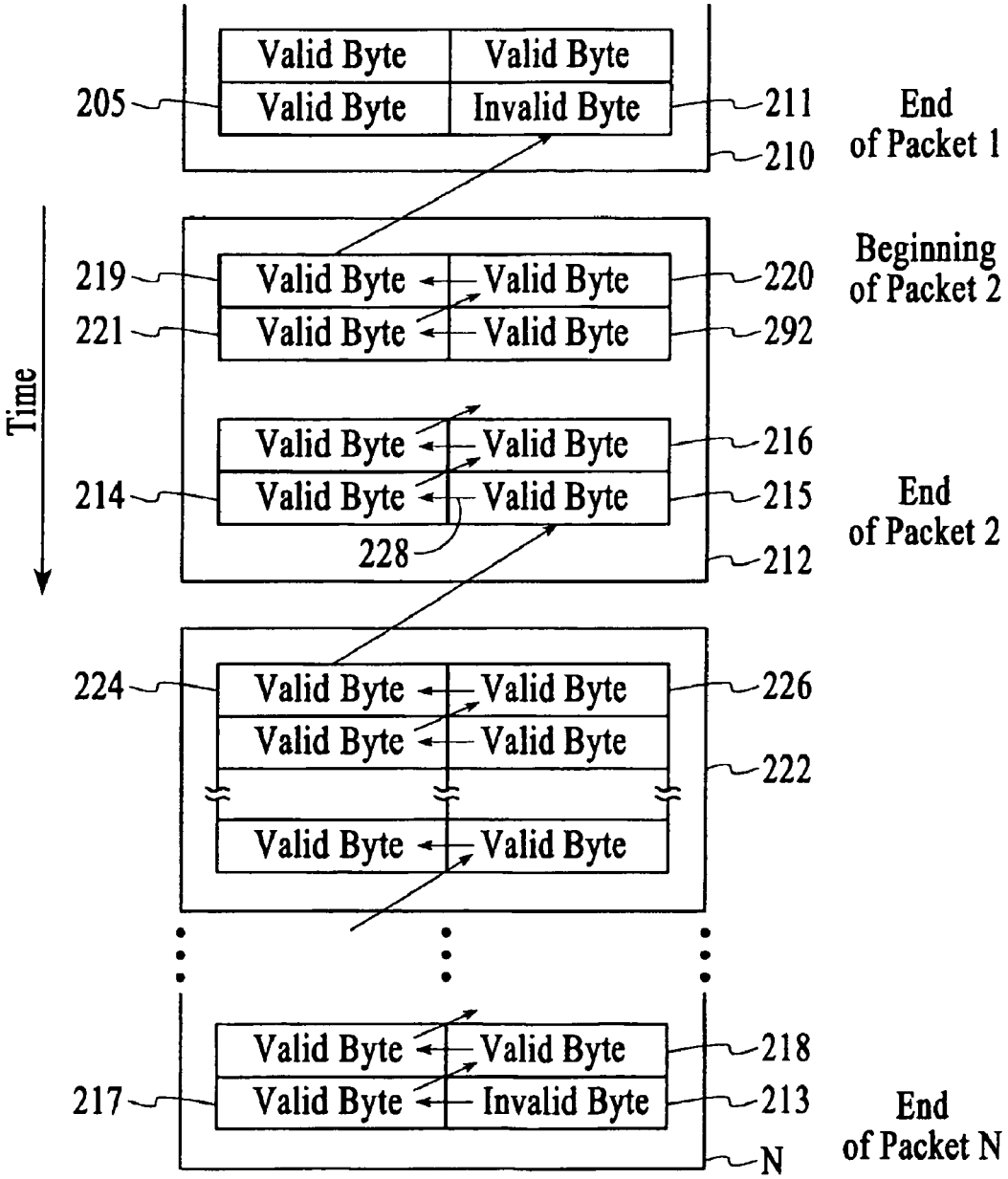
FIG. 2 illustrates concatenating data bytes from three or more packets in accordance with an exemplary embodiment of the present invention.

FIG. 2 illustrates concatenating data bytes from three or more packets 210, 212, N, in accordance with another exemplary embodiment of the present invention.

In this specific embodiment, concatenation is illustrated where second packet 212 ends with a valid data byte 215 so that concatenation continues until a packet N ending with an invalid byte 213 is received. In FIG. 2, the concatenation process first drops invalid byte 211 of packet 210. Next, valid byte 219 is concatenated with valid byte 205 to complete the last word of packet 210. Next, byte shifting starts for the second packet 212. Byte shifting occurs in a similar manner as described with reference to FIG. 1B, except that because packet 212 ends with valid data 215, byte shifting continues after packet 212. That is, after byte 214 is shifted to byte 216, byte 215 is shifted to byte 214. Thus byte 214 has valid data while byte 215 becomes empty. Packet 212 awaits the arrival of a subsequent packet having a valid byte. The first valid byte of this subsequent packet is shifted to byte 215 to complete the last word of packet 212. Thereafter, packet 212 is sent out.

Byte shifting continues for subsequent (N−1) packets all of which end with two valid bytes. Byte shifting ends when packet N is reached which ends with one valid byte 217 and one invalid byte 213. At this point, valid byte 217 is shifted to byte 218, and invalid byte 213 is dropped. Byte shifting then comes to an end.

FIGS. 1B and 2 show two different conditions for byte treatment according to the present invention.

There are, however, a number of other conditions that are also addressed by the method of the present invention. Every possible condition for different byte treatment inside packets and at packet boundaries can be defined by any combination of the following:

There are two possible conditions (1) and (2), below, for byte treatment inside a packet. Note that these two conditions do not address packet boundary conditions (i.e., end or start of a packet). There are four possible packet boundary conditions, (3) through (6), below:

(1) all prior packets carry even number of valid bytes of data, and therefore no byte shifting occurs inside a packet;

(2) one prior packet ends with a single valid byte, and therefore byte shifting occurs inside the subsequent packets until a packet ending with a single valid byte arrives;

(3) all previous packets end with an even number of valid bytes, and the current packet ends with two valid bytes;

(4) all previous packets end with an even number of valid bytes, and the current packet ends with only one valid byte;

(5) a previous packet ends with a single valid byte, and byte shifting is occurring in the current packet, and the current packet ends with two valid bytes; and (6) a previous packet ended with a single valid byte, byte shifting is occurring in the current packet, and the current packet ends with one valid byte.

Figure 3:
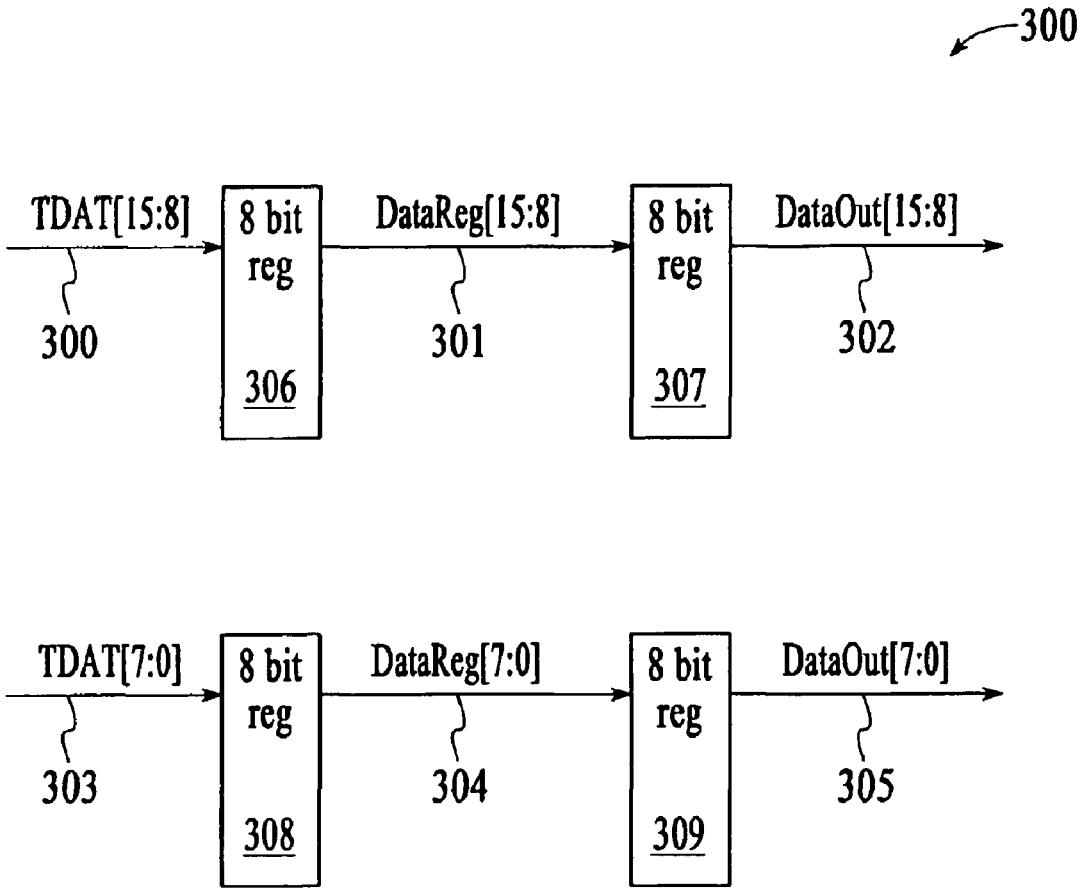
FIG. 3 illustrates an exemplary circuitry for outputting 16 bit words when no byte shifting is required in accordance with an embodiment of the present invention.

Various exemplary circuits for implementing the functionality required by the above six different conditions for byte treatment will be presented hereinafter. Referring to FIG. 3, there is shown an exemplary circuitry 300 for generating 16-bit words when no byte shifting is required in accordance with an embodiment of the present invention. Specifically, circuitry 300 implements the functionality associated with conditions (1) and (3) above, where neither byte dropping nor byte shifting is required. For these situations, no packet ends with a valid byte.

In this exemplary implementation, among other components, circuitry 300 includes two levels of registers. A first level includes register 306 and register 308, both of which are 8-bit registers. Register 306 has an input 300 for receiving bits 8 through 15 of an incoming data word. This is represented as TDAT[15:8]. Register 308 has an input 303 for receiving bits 0 through 7 of the incoming data word. This input is represented as TDAT[7:0]. The second level of registers also includes two 8-bit registers 307 and 309. The input of register 307 is coupled to output 301 of register 306. Output 302 of register 307 provides data output for the 16-bit word. This is shown as DataOut[15:8]. The input of register 309 is connected to output 304 of register 308. This is represented as DataReg[7:0]. The output 305 of data register 309 is represented as DataOut[7:0].

In operation, output 302 is a copy of input 300 that is two clock cycles delayed. Similarly, output 305 is a copy of input 303 but two clock cycles delayed. When received, the input data is sent through circuitry 300 with no shifts. Specifically, bit locations for input data are maintained from input to output. For example, referring to FIG. 1B, byte 122 with bits 15:8 is passed through registers 306 and 307 without changing bit locations. On the same cycle, byte 124 is passed through registers 308 and 309 without bit location changes. On the next clock cycle, the next word is passed through without changes, and so forth. In this manner, an exemplary circuit is provided for passing received data bytes without changes, when such bytes are valid.

Figure 4:
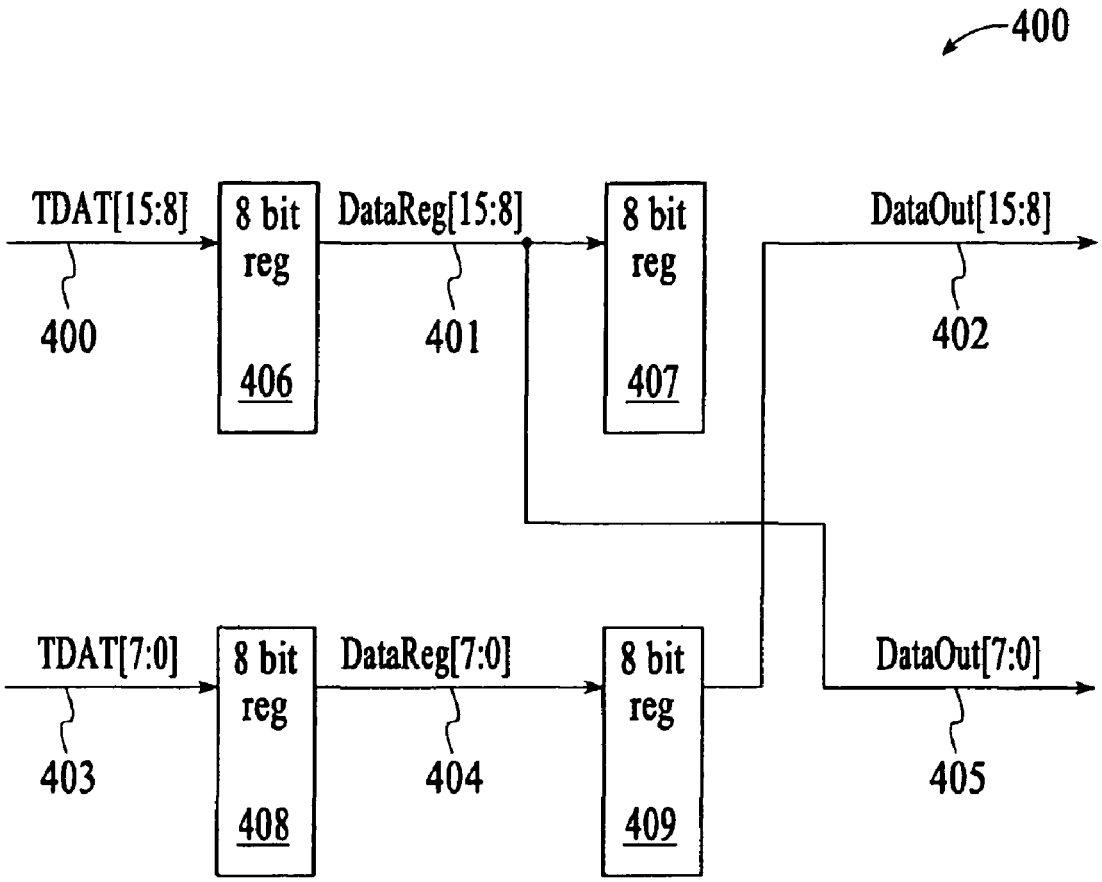
FIG. 4 illustrates a circuitry for shifting data bytes to produce exemplary 16 bit data in accordance with an embodiment of the present invention.

FIG. 4 illustrates a circuitry 400 for shifting data bytes to generate exemplary 16-bit data words in accordance with another embodiment of the present invention. Specifically, circuitry 400 provides data paths for conditions (2) and (5) above, where a prior packet has ended with a single valid byte, and subsequent packets, including the current packet, end with two valid bytes. Thus, this condition performs essentially a continuous byte shifting operation. Among other components, circuitry 400 includes two levels of registers as in FIG. 3. These registers are registers 406, 408, 407 and 409. As shown, register 406 comprises an input 400 for TDAT[15:8], and an output 401 for DataReg[15:8]. Output 401 is coupled to the input of register 407. Further, output 401 is coupled to output 405, DataOut[7:0]. Register 408 has an input 403 for TDAT[7:0] and an output 404 for DataReg[7:0]. Output 404 is coupled to the input of register 409 having an output 402 for DataOut[15:8].

The operation of circuitry 400 will be described with reference to FIG. 2. Packet 210 can be considered as the prior packet ending with one valid byte (205), while packet 212 is the first one of several succeeding packets each ending with two valid bytes (214 and 215 in the case of packet 212). Accordingly, circuit 400 operates to continuously shift data, one byte at a time, within a word, e.g., 215 to 214, between words in the same packet, e.g., 214 to 216, and between words falling on the boundary between two packets ending with valid bytes, e.g., 224 to 215.

Referring to FIG. 4 and considering, for example, the boundary condition between packets 212 and 222, during a first clock cycle, input 400 TDAT[15:8] carries values for byte 214 (FIG. 2), and input 403 TDAT[7:0] carries invalid byte 215. These 16 bits arrive and are stored in registers 406 and 408, in one clock cycle. On the next clock cycle, bytes 214 and 215 are clocked into the next level of registers 407 and 409, respectively, and bytes 224 [15:8] and 226 [7:0] arrive at input terminals 400 and 403, respectively, and are clocked into registers 406 and 408, respectively.

Note that the data in registers 407 and 409 are one clock period delayed with respect to data in registers 406 and 408. As shown in FIG. 4, the 16-bit output DataOut[15:0] is formed by using byte 215 at the output of register 409 for bits DataOut[15:8], and using byte 224 at the output of register 406 for bits DataOut[7:0]. This results in shifting byte 215 as shown by arrow 228 in FIG. 2, and shifting byte 224 as shown by arrow 230 in FIG. 2,. Circuit 400 thus implements the continuous byte shifting in the same manner as shown by the arrows in FIG. 2

Figure 5:
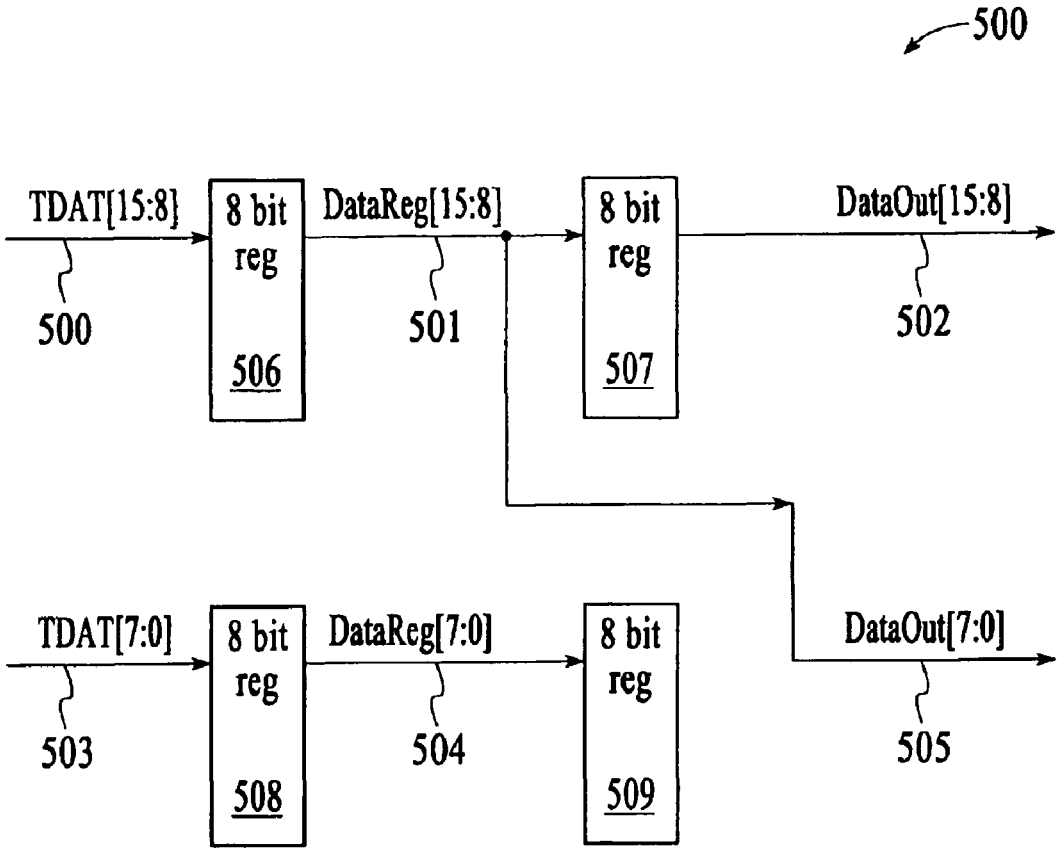
FIG. 5 illustrates exemplary circuitry for outputting 16 bit data when prior packets end with even valid bytes and the current packets ends with a single valid byte.

FIG. 5 illustrates exemplary circuitry 500 for generating 16-bit data for the condition where prior packets end with even valid bytes and the current packet ends with a single valid bytes. Specifically, circuitry 500 is designed to address boundary condition (4) listed above. Among other components, circuitry 500 includes two levels of registers 506 and 508 that process byte [15:8] of each word, and registers 507 and 509 that process byte [7:0] of each word. As shown, register 506 comprises an input 500 for TDAT[15:8], and an output 501 for DataReg[15:8]. Output 501 is coupled to the input of register 507, and is coupled to output 505, DataOut [7:0]. Register 507 has an output 502 for DataOut[15:8]. Register 508 has an input 503 for TDAT[7:0] and an output 504 for DataReg[7:0]. Output 504 is coupled to the input of register 509.

The operation of circuit 500 can be described with reference to the exemplary packets shown in FIG. 1B, where packet 101 is considered the current packet ending with one invalid byte. In a similar manner as described in connection with the operation of circuit 400 above, at the packet boundary, two consecutive clock cycles cause registers 507 and 509 to store bytes 105 and 103, respectively, and registers 506 and 508 to store bytes 106 and 107, respectively. To form the output data DataOut[15:0], circuit 500 taps output 502 of register 507, or byte 105, for DataOut [15:8], and taps output 501 of register 506, or byte 106, for DataOut[7:0], as shown. As shown in FIG. 5, the output of register 509, which in this condition stores invalid byte 103 is not used. This results in invalid byte 103 being dropped, and bits [15:8] of byte 105 begin concatenated with bits [15:8] of byte 106, although they are one clock cycle apart.

The final condition described in (6) above addresses the situation where a prior packet ends with a single valid byte, and byte shifting is occurring in a current packet that also ends with a single valid byte. An example of this condition is illustrated in FIG. 1B when considering packet 102 as the current packet. Due to the byte shifting that is initiated when a first packet is encountered that ends with one valid byte, the result of a second packet ending with one valid byte is that, after byte shifting in the second packet, it ends with a single invalid byte in its last word. This last invalid word can thus be dropped by skipping one clock cycle.

Figure 6:
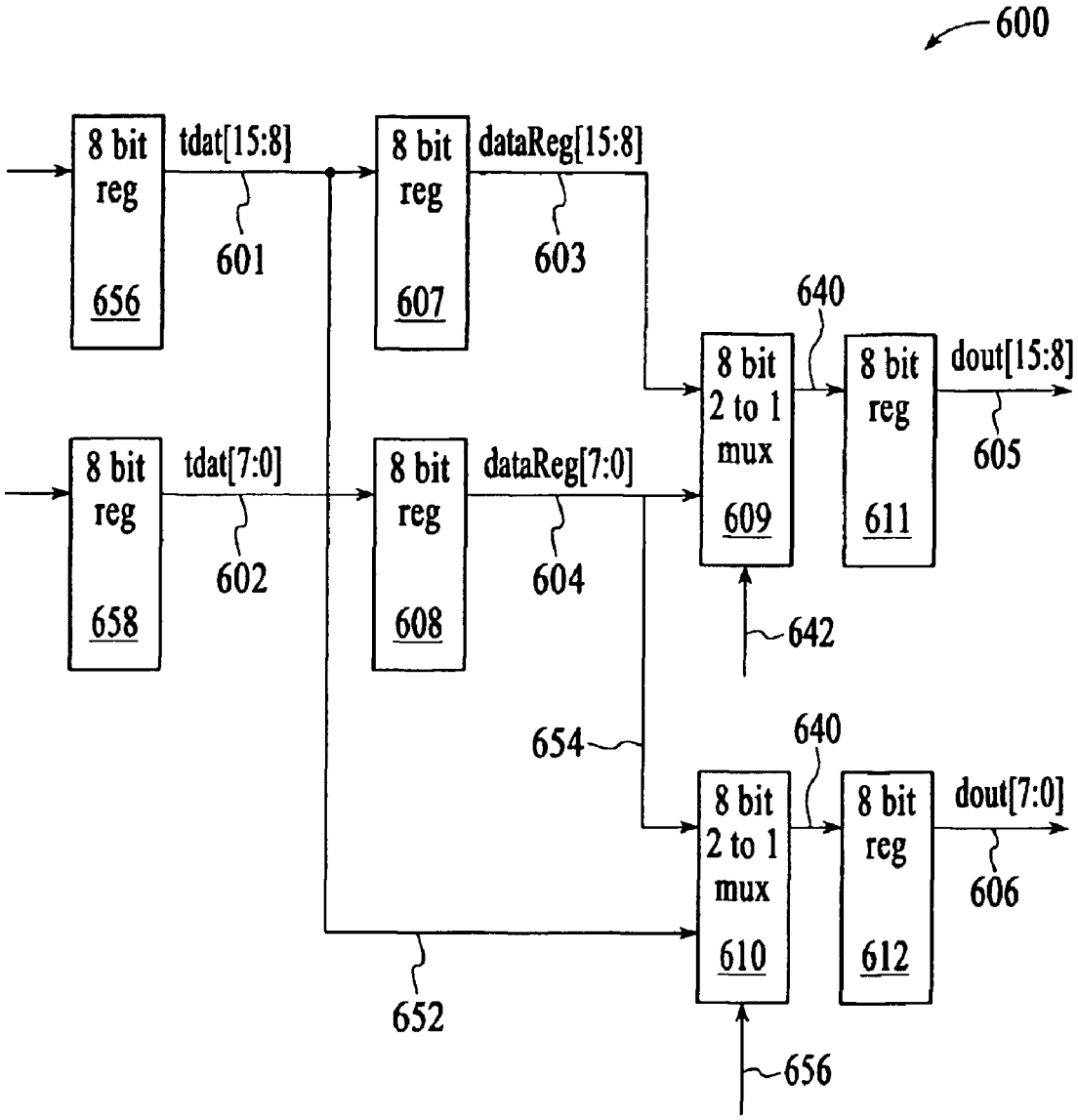
FIG. 6 illustrates exemplary circuitry for dropping invalid bytes, concatenating and shifting data bytes in accordance with an exemplary embodiment of the present invention.

FIG. 6 illustrates an exemplary circuitry 600 for implementing the packet treatment as described above under condition (6), according to one embodiment of the invention. In this specific example, since packet condition (6) is essentially a combination of the other conditions, circuitry 600 is also a combination of circuitry 400 of FIG. 4 and circuitry 500 of FIG. 5. Among other components, circuitry 600 includes a register 607 having an input port 601 for receiving input data TDAT[15:8] and having an output port 603 coupled to the input port of an 8-bit 2:1 multiplexer (MUX) 609. A register 608 has an input port 602 for receiving input data TDAT[7:0], and an output port 604 that couples to another input of MUX 609 as well as an input of another 8-bit 2:1 MUX 610. The other input of MUX 610 receives input data TDAT[15:8].

MUX 609 receives a control signal on line 642 and MUX 610 receives its control signal on line 656. Further, circuitry 600 includes a register 611 having an input port coupled to output port 640 of MUX 609, and a register 612 having an input port coupled to output port 650 of MUX 610. Register 611 generates output data dout[15:8], and register 612 generates output data dout[7:0]. Further, TDAT[15:8] is received from an output of register 656 while TDAT[0:7] is received from an output of register 658.

In operation, for packet conditions (1) and (3) outlined above, the control signal on line 642 for MUX 609 selects the output of register 607, dataReg[15:0] on line 603, to pass to register 611, and the control signal on line 656 for MUX 610 selects the output of register 608, dataReg[7:0] on line 604, to pass to register 612. This selection results in a circuit equivalent to that of FIG. 3, which handles the condition where there is no need for dropping or shifting any bytes.

For packet conditions (2) and (5), the control signal on line 642 for MUX 640 selects the output of register 608, dataReg [7:0] on line 604, to pass to register 611, and the control signal on line 656 for MUX 610 selects input data TDAT[15:8] to pass to register 612. This selection results in a circuit equivalent to that of FIG. 4, which implements the required continuous byte shifting.

For packet condition (4), the MUX control signals cause MUX 609 to select dataReg[15:8] on line 603 to pass to register 611, and cause MUX 656 to select TDAT[15:8] to pass to register 612. This selection results in a circuit equivalent to that of FIG. 5 implementing the required functionality for packet condition (4). In this manner, MUXes 609 and 610 allow circuit 600 to be reconfigured the data path to address all of the different combinations of byte treatment.

Figure 7:
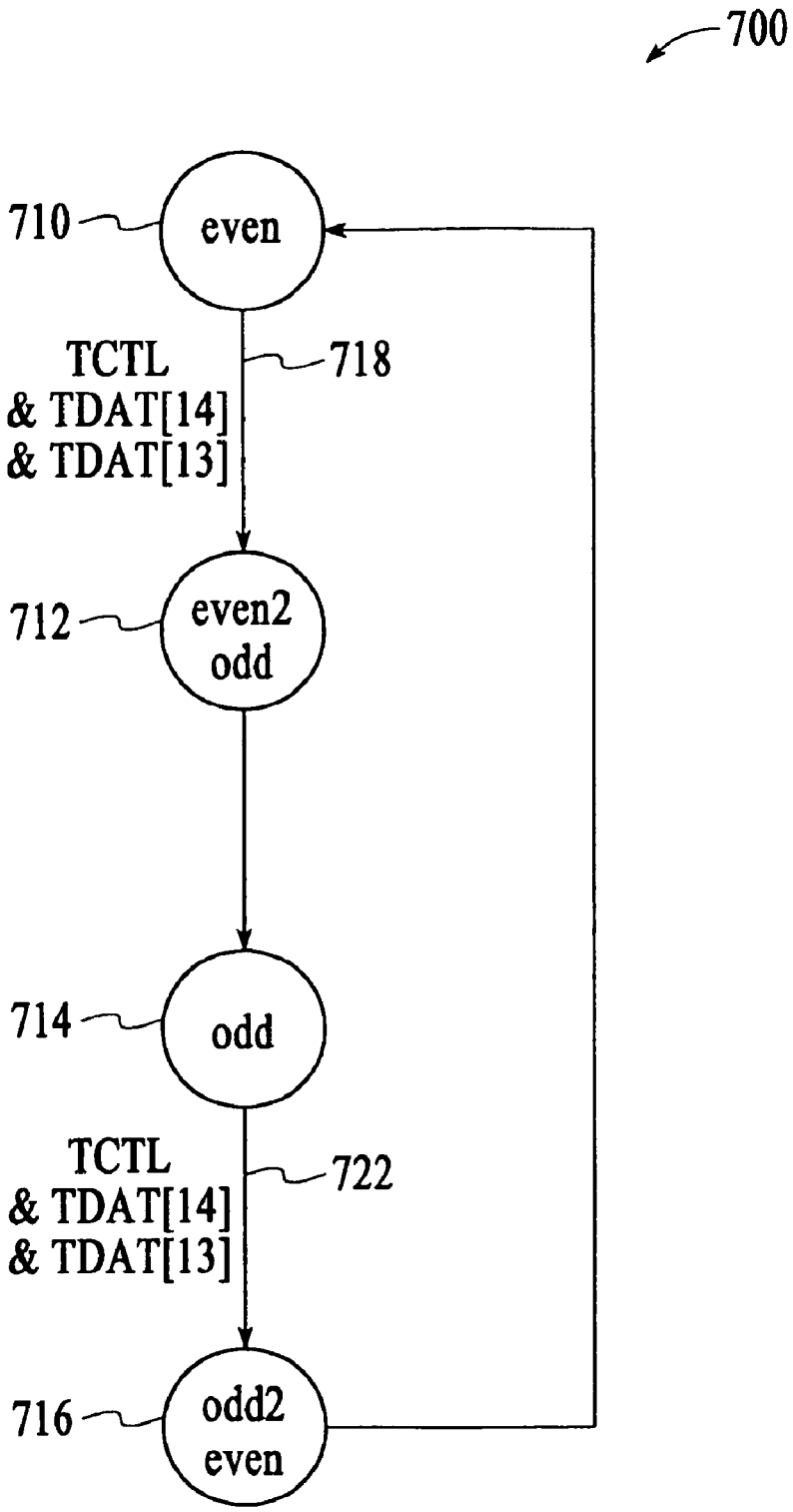
FIG. 7 is an exemplary state diagram for implementing control logic of the byte multiplexing of FIG. 6.

FIG. 7 is an exemplary embodiment of a state machine 700 for providing control signals to selection line 642 of MUX 609 and selection line 656 of MUX 610. It is to be understood that various logic circuit implementations for the state diagram of FIG. 7 are possible based on known logic design techniques. As shown, four states represent combinations of the six conditions discussed with reference to FIGS. 1B and 2. For example, EVEN state 710 represents a combination of conditions (1) and (3). In EVEN state 710, no odd numbered packet is received. Thus, there is no need to do any byte shifting. The transition from EVEN state 710 to EVEN2ODD state 712 takes place when the control word shows that the current packet ends with a single valid byte (TCTL & TDAT [14] & TDAT[13] 718). EVEN2ODD state 712 lasts for only one clock cycle, during which time, the last valid byte of the current packet is concatenated with the first byte of the following packet.

Thereafter, state machine 700 enters the ODD state 714, in which all bytes are left shifted by 1 byte position. State machine 700 comes out of ODD state 714 when the control word shows that a second packet ending with a single valid byte has arrived (TCTL & TDAT[14] & TDAT[13], 722). This is when ODD2EVEN state 716 is entered. ODD2EVEN state 716 lasts for only 1 clock cycle. In this state, a control signal is sent out to the transmit FIFO, informing the FIFO to drop one whole word from the incoming transmit data. After ODD2EVEN state 716, state machine 700 returns to EVEN state 710.

In this fashion, the present invention provides a circuit and method for processing communication packets and valid data bytes in a communication system. While the above is a complete description of exemplary specific embodiments of the invention, additional embodiments are also possible.

Therefore, the above description should not be taken as limiting the scope of the invention, which is defined by the appended claims along with their full scope of equivalents.

What is claimed is:

1. A method for processing data packets within a communication system comprising:

receiving a first data packet having a plurality of bytes of data;

determining whether the first data packet ends with an invalid byte of data;

if an invalid byte of data is detected in the first data packet, dropping the invalid byte of data;

receiving a second data packet having a plurality of bytes of data;

shifting a byte of data from the second *data* packet in place of the dropped invalid byte of data in the first *data* packet; and

[continue] *continuing* shifting data one byte at a time in the second data packet.

2. The method of claim 1 wherein each byte of data in a data packet forms one half of a data word.

3. The method of claim 2 wherein each data word comprises a first 16-bit byte and a second 16-bit byte[, and the communication system is a synchronous optical network (SONET)].

4. A method for processing data packets within a communication system, the method comprising:

receiving a first data packet in the communication system, the first *data* packet ending with a valid byte and an invalid byte of data;

dropping the invalid byte of data;

receiving a second data packet that begins with a first valid byte of data; and concatenating the valid byte of the first data packet with the first valid byte of the second data packet.

5. The method of claim 4 wherein the second data packet further comprises a second valid byte, a third valid byte and a fourth invalid byte.

6. The method of claim 5 further comprising shifting the second valid byte into a location previously occupied by the first valid byte.

7. The method of claim 6 further comprising shifting the third valid byte into a location previously occupied by the second valid byte.

8. The method of claim 5 further comprising flagging the fourth invalid byte as invalid.

9. The method of claim 4 wherein the act of concatenating further [comprising] *comprises* concatenating the valid byte of the first data packet and the *first* valid byte of the second data packet into a 128 bit envelope.

10. The method of claim 4 wherein the second data packet is 16 bits.

11. The method of claim 4 wherein the communication system is a synchronous optical network (SONET).

12. The method of claim 4 wherein the act of concatenating further comprises linking the valid byte of the first data packet and the *first* valid byte of the second data packet into a high speed [packed] *packet*.

13. The method of claim 12 wherein the high speed packet is 128 bits.

14. The method of claim 11 wherein concatenating occurs at an interface between a framing chip and a system chip.

15. A concatenation circuitry, comprising:

a first multiplexing logic circuitry having a data output port, a data select port, and first and second data input ports, the data select port for selectively coupling any one of the first[,] or second data input ports to the data output port;

a first register, having a data input port for receiving input data and a data output port for coupling to the first data input port of the *first* multiplexing logic circuitry;

a second register having a data input port for receiving input data, and [for coupling to the data input port of the first register, the second register having] a data output port for coupling to the second data input port of the *first* multiplexing logic circuitry;

a third register having a data input port for coupling to the data output port of the first multiplexing logic circuitry, and a data output port for outputting data;

a fourth register having a data input port, and a data output port for outputting data; and a second multiplexing logic circuitry having a first data input port for coupling to the data output port of the second register, the second multiplexing logic circuitry having a second data input port for coupling to the *data* input port of the [second] *first* register, the second multiplexing logic circuitry having a data output port for coupling to the data input port of the fourth register, *and* the second multiplexing logic circuitry having a data select port for selectively coupling either the first data input port or the second data input port with the data output port of the second multiplexing logic circuitry.

16. The circuitry of claim 15 wherein the data output port of the fourth register is for bits 0 through 7.

17. The circuitry of claim 15 wherein the data output ort of the third register is for bits 8 through 15.

18. A logic circuitry for processing data packets within a communication system such that data packets contain valid bytes of data, the circuitry comprising:

logic circuitry for determining that a first *data* packet ends with a valid byte and an invalid byte of data;

logic circuitry for dropping the invalid byte of data;

logic circuitry for determining that a second data packet that begins with a valid byte of data; and logic circuitry for concatenating the valid byte of the first data packet with the valid byte of the second data packet.

19. The logic circuitry of claim 18 further comprising logic circuitry for linking the valid byte of the first data packet and the valid byte of the second data packet into a high speed [packed] *packet*.

20. The logic circuitry of claim 18 wherein the high speed packet is 128 bits.

21. The logic circuitry of claim 18 wherein the first data packet is 16 bits wide.

22. The logic circuitry of claim 18 wherein concatenating occurs at an interface between a framing chip and a system chip.

23. A circuit for processing packets of data wherein a packet includes one or more words each having a first byte and a second byte, the circuit comprising:

a first register coupled to receive and store the first byte of each word;

a second register coupled to receive and store the second byte of each word;

a third register coupled to the first register and configured to receive and store contents of the first register in response to a clock signal;

a fourth register coupled to the second register and configured to receive and store contents of the second register in response to the clock signal; and a multiplexing circuit coupled to the third and fourth registers and configured to selectively rearrange pairing of bytes.

24. The circuit of claim 23 wherein the multiplexing circuit comprises a first multiplexer having a first input coupled to an output of the third register, and having a second input coupled to an output of the fourth register.

25. The circuit of claim 24 wherein the multiplexing circuit comprises a second multiplexer having a first input coupled to [an] *the* output of the fourth register, and having a second input coupled to an input of the third register.

26. The circuit of claim 25 further comprising control logic circuitry coupled to a select port of the first multiplexer and a select port of the second multiplexer.

*27. The method of claim 1 wherein the communication system transmits digital bit streams via repeating fixed frames.*

*28. The method of claim 4 wherein the communication system transmits digital bit streams via repeating fixed frames.*

*29. The logic circuitry of claim 18 wherein the communication system transmits digital bit streams via repeating fixed frames.*

*30. The method of claim 1, wherein the first data packet is received at a framer.*

*31. The method of claim 1, further comprising:*

*sending the first data packet from a network processor.*

*32. A system, comprising:*

*a transmitting communication device configured to transmit a plurality of data packets at a multiple-byte-wide interface, wherein at least one packet in the plurality of data packets comprises one or more invalid bytes; and*

*a receiving communication device comprising:*

*a receiver configured to receive the plurality of data packets, and*

*a shifter utilizing byte shifting to remove the one or more invalid bytes from the at least one packet.*

*33. The system of claim 32, wherein the transmitting communication device is a network processor.*

*34. The system of claim 32, wherein the receiving communication device is a framer.*

*35. The system of claim 32, wherein the shifter comprises:*

*one or more registers; and*

*one or more multiplexers.*

*36. The system of claim 35, wherein the one or more multiplexers provides an output based on a presence of the one or more invalid bytes.*

*37. The system of claim 36, wherein a first multiplexer of the one or more multiplexers provides an output from a first register of the one or more registers, and provides an output from a second register of the one or more registers upon detection of an invalid byte.*

*38. The system of claim 32, wherein the shifter stores bytes received from the multiple-byte-wide interface in a plurality of registers, and generates an output by (i) selecting registers to provide the output, and (ii) removing invalid bytes by altering the selection of registers.*

*39. The system of claim 32, further comprising:*

*a serializer-deserializer configured to accept an output of the receiving communication device.*

*40. The system of claim 39, wherein the output of the receiving communication device comprises an output of a first multiplexer.*

*41. The system of claim 39, wherein the output of the receiving communication device is null in a presence of two or more invalid bytes.*

*42. The system of claim 41, wherein the receiving communication device further comprises a clock and wherein the output of the receiving communication device is null for at least one cycle of the clock in the presence of two or more invalid bytes.*

*43. A framer, configured for use in a communication system, comprising:*

*a receiver configured to receive a plurality of packets, wherein at least one packet in the plurality of packets comprises one or more invalid bytes; and*

*a shifter utilizing byte shifting to remove the one or more invalid bytes from the at least one packet in the plurality of packets; and*

*a transmitter configured to send one or more packets in the plurality of packets in a fixed frame, wherein each of the sent one or more packets has the one or more invalid bytes removed.*

*44. The logic circuitry of claim 42, wherein the communication system transmits digital bit streams via repeating fixed frames.*

*45. A method for processing data packets comprising:*

*receiving a first data packet having a plurality of bytes of data;*

*determining whether the first data packet ends with an invalid byte of data;*

*if an invalid byte of data is detected in the first data packet, dropping the invalid byte of data;*

*receiving a second data packet having a plurality of bytes of data;*

*shifting a byte of data from the second data packet in place of the dropped invalid byte of data in the first packet; and*

*continuing to shift data one byte at a time from the second data packet.*

*46. The method of claim 45, wherein the data packets are processed within a communication system, and the communication system transmits digital bit streams via repeating fixed frames.*

* * * * *

UNITED STATES PATENT AND TRADEMARK OFFICE

CERTIFICATE OF CORRECTION

PATENT NO. : RE43,218 E
APPLICATION NO. : 12/215662
DATED : February 28, 2012
INVENTOR(S) : Annadurai et al.

It is certified that error appears in the above-identified patent and that said Letters Patent is hereby corrected as shown below:

Column 10, line 9, in Claim 17, delete "ort" and insert -- [ort] *port* --.

Column 11, line 13, in Claim 32, delete "*packets*, *and*" and insert -- *packets; and* --.

Column 12, line 20, in Claim 44, delete "*The logic circuitry of claim 42*," and insert -- *The framer of claim 43*, --.

Signed and Sealed this
Twenty-third Day of October, 2012

David J. Kappos

David J. Kappos
*Director of the United States Patent and Trademark Office*